United States Patent
Quaranta

(10) Patent No.: US 7,543,247 B2
(45) Date of Patent: Jun. 2, 2009

(54) EFFICIENT METHOD OF MIGRATING LOTUS DOMINO DOCUMENTS TO A NON-DOMINO WEB SERVER, WHILE PRESERVING SECTIONS, USING PORTABLE JAVASCRIPT

(75) Inventor: Michael P. Quaranta, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 10/710,652

(22) Filed: Jul. 27, 2004

(65) Prior Publication Data
US 2006/0036938 A1    Feb. 16, 2006

(51) Int. Cl.
*G06F 3/14* (2006.01)

(52) U.S. Cl. .................. 715/854; 707/10; 345/418; 715/503

(58) Field of Classification Search .......... 715/713, 715/503; 707/10; 345/418
See application file for complete search history.

(56) References Cited

U.S. PATENT DOCUMENTS

| | | | | |
|---|---|---|---|---|
| 6,078,327 | A * | 6/2000 | Liman et al. | 715/854 |
| 6,314,424 | B1 * | 11/2001 | Kaczmarski et al. | 707/10 |
| 6,574,644 | B2 * | 6/2003 | Hsu et al. | 715/501.1 |
| 2002/0099723 | A1 * | 7/2002 | Garcia-Chiesa | 707/200 |
| 2003/0202019 | A1 * | 10/2003 | Detweiler et al. | 345/853 |
| 2005/0198582 | A1 * | 9/2005 | Hennum et al. | 715/772 |

OTHER PUBLICATIONS

Article entitled "Using Transend Migrator for Lotus Notes data to Microsoft Outlook/Exchange", by Transend, dated Jun. 28, 2004.*
Article entitled "Collaborative Application Integration, Extension, and Migration with Casahl ecKnowledge", by Casahl, dated Jan. 2004.*
Article entitled "Replic-Action Release 6.0", by Casashl, dated Apr. 1999.*
Article entitled "Callapse-to-Zoom: Viewing Web pages on Small Screen Devices by Interactively Removing Irrelevant Content, by Baudisch et al., dated Jul. 17, 2004".*

* cited by examiner

*Primary Examiner*—Tim Vo
*Assistant Examiner*—Mahesh H Dwivedi
(74) *Attorney, Agent, or Firm*—Delio & Peterson, LLC; Robert Curcio

(57) ABSTRACT

A method of mirroring Lotus Notes Domino documents to a non-Domino web server, while preserving document sections. Each request for expansion or collapsing of a section is handled at the client end when serving the mirrored copies of the original document. The number of fetches is reduced during retrieval of each state of the Lotus Notes Domino document. Each fetch resides on a mirrored document of a non-Domino web server in a form that does not require a unique html document for each fetch.

12 Claims, 4 Drawing Sheets

FIG.4

COLLAPSED "TWISTIE" → ▸
EXPANDED "TWISTIE" → ▼
} — 50

——————— NO SECTIONS EXPANDED ———————
THIS DOCUMENT DESCRIBES THREE MAIN POINTS, LISTED BELOW.
▸ SECTION 1
▸ SECTION 2
▸ SECTION 3                                                — 52

——————— SECTION 2 EXPANDED ———————
THIS DOCUMENT DESCRIBES THREE MAIN POINTS, LISTED BELOW.
▸ SECTION 1
▼ SECTION 2
    BELOW ARE SOME SUBSECTIONS OF SECTION 2:
    ▸ SECTION 2.1
    ▸ SECTION 2.2                                  — 54
    ▸ SECTION 2.3
▸ SECTION 3

——————— SECTION 2, 2.3 EXPANDED ———————
THIS DOCUMENT DESCRIBES THREE MAIN POINTS, LISTED BELOW.
▸ SECTION 1
▼ SECTION 2
    BELOW ARE SOME SUBSECTIONS OF SECTION 2:
    ▸ SECTION 2.1                                  — 56
    ▸ SECTION 2.2
    ▼ SECTION 2.3
        IN THIS SECTION, THERE ARE THREE ITEMS OF INTEREST:
        ▸ SECTION 2.3.1
        ▸ SECTION 2.3.2
        ▸ SECTION 2.3.3
▸ SECTION 3

——————— SECTION 2, 2.3, 2.3.2 EXPANDED ———————
THIS DOCUMENT DESCRIBES THREE MAIN POINTS, LISTED BELOW.
▸ SECTION 1
▼ SECTION 2
    BELOW ARE SOME SUBSECTIONS OF SECTION 2:
    ▸ SECTION 2.1
    ▸ SECTION 2.2                                  — 58
    ▼ SECTION 2.3
        IN THIS SECTION, THERE ARE THREE ITEMS OF INTEREST:
        ▸ SECTION 2.3.1
        ▼ SECTION 2.3.2
            SO NOW YOU KNOW WHAT'S IN THIS SECTION
        ▸ SECTION 2.3.3
▸ SECTION 3

US 7,543,247 B2

EFFICIENT METHOD OF MIGRATING LOTUS DOMINO DOCUMENTS TO A NON-DOMINO WEB SERVER, WHILE PRESERVING SECTIONS, USING PORTABLE JAVASCRIPT

BACKGROUND OF INVENTION

1. Field of the Invention

The present invention relates to network computing and the retrieval of documents. Specifically, the present invention relates to the migrating of section-rich Lotus Notes Domino documents to a non-Domino web server.

2. Description of Related Art

Lotus Notes and Domino are client-server based groupware software. Lotus Notes is the client; performing e-mail, calendaring, group scheduling, Web access, and information management. Domino is the integrated messaging and Web application server.

Domino transforms the Notes server into an interactive Web applications server. This server combines the open networking environment of Internet standards and protocols with the powerful application development facilities of Lotus Notes. Domino provides businesses and organizations with the ability to rapidly develop a broad range of business solutions for the Internet and for intranets. The Domino server has made the ability to publish Lotus Notes documents to the Web a dynamic process.

The documents in a Domino database can represent different objects in a business process. For example, the data in these documents may be about customers, employees, products, purchase orders, delivery reports, billing information, or other business objects that are part of a business logic set. In a business workflow, the code can be differentiated between technical infrastructure code-such as accessing a Lotus Notes database, accessing a Lotus Notes document via a view, and accessing the different items in a Lotus Notes document-and the code implementing the business logic-such as accessing all orders delivered to a specific customer during a prior time period.

Lotus Notes/Domino documents have a feature known as sections, which contain additional data that is hidden until expanded. Domino servers can display a document in various states of section expansions. A document with several sections, sub-sections, sub-sub-sections, and the like, can be terse when all sections are collapsed, or extremely verbose when all sections and sub-sections are expanded. Even though the data is from the source of one single document in a Domino database, each of the various states of section expansion in the document are associated with a unique URL.

The architecture of such documents presents several problems to any tool that attempts to mirror this data to a non-Domino web server. First, it can take as many as $2^N$ fetches (where N is the number of sections or various sub-sections) to retrieve each state of the document, because a unique URL references each expansion state. This can literally take hours to mirror documents that contain numerous nested sections. Second, each of these resulting fetches must reside on the mirror document as a unique html document, which can result in well over one hundred times the storage of the original document. Third, whether served by a Domino or non-Domino web server, when serving the mirrored copies of the original document, each time a user clicks on an icon, such as the familiar triangular "twisty" icon, to expand or collapse a section, the request for expansion or collapsing must be handled at the server end, not at the client (browser) end, causing unnecessary client-server traffic.

Bearing in mind the problems and deficiencies of the prior art, it is therefore an object of the present invention to provide a method to mirror Lotus Notes/Domino documents to a non-Domino web server.

It is another object of the present invention to provide a method to reduce the number of fetches when retrieving each state of a Lotus Notes/Domino document being mirrored to a non-Domino web server.

A further object of the invention is to provide a method that allows resulting fetches of a Lotus Notes/Domino document to reside on a mirrored document of a non-Domino web server in a form that does not require a unique html document for each fetch.

It is yet another object of the present invention to provide a method that allows each request for expansion or collapsing of a section to be handled at the client (browser) end when serving the mirrored copies of the original document.

Still other objects and advantages of the invention will in part be obvious and will in part be apparent from the specification.

SUMMARY OF INVENTION

The above and other objects, which will be apparent to those skilled in art, are achieved in the present invention, which is directed to in a first aspect a method of migrating a Lotus Notes Domino document to a non-Domino web server having a client end and a server end, comprising: implementing a series of fetches for a Lotus Notes Domino document having a plurality section levels; creating a single document having all section data; and expanding and collapsing the section data at the client end. This includes performing 1+N fetches, one for each level of sections.

In a second aspect, the present invention is directed to a method of migrating a section-rich Domino document to a non-domino web server having a client end and a server end, comprising: performing iterative recursive intelligent fetch process steps; performing a recursive differential process step; and expanding and collapsing the section data at the client end. The iterative recursive intelligent fetch process includes: parsing the Domino document; identifying unexpanded sections; and constructing a URL to expand the unexpanded sections. The recursive differential process step includes: inputting expanded section data at depth N expansion; inputting expanded section data at depth N–1 expansion; comparing pre- and post-expanded section documents through differences in html; creating delta html files based on the comparison; adding javascript conditionals around the delta html files; and merging the delta html files into the depth N–1 expansion. The parsing of the Domino document includes: performing an iterative process to identify all sub-sections of the document, comprising: fetching a document with all sections collapsed and identifying sections having expansion; if level 1 section expansions are identified, fetching the document having level 1 sections expanded; discovering and parsing new sub-sections below the level 1 sections; if level 2 section expansions are identified, fetching the document having level 2 sections expanded; discovering and parsing new sub-sections below the level 2 sections; and continuing the iterative process until level N section expansions are identified and fetched. The javascript comprises: a session cookie remembering when the section was expanded; a set cookie to remember when the section is collapsed; and a set cookie to remember when the section is currently expanded.

In a third aspect, the present invention is directed to a method of migrating a section-rich Domino document to a non-domino web server having a client end and a server end, comprising: performing iterative recursive intelligent fetch process steps including: parsing the Domino document; identifying unexpanded sections; and constructing a URL to expand the unexpanded sections; performing a recursive differential process step including: inputting expanded section data at depth N expansion; inputting expanded section data at depth N−1 expansion; comparing pre- and post-expanded section documents through differences in html; creating delta html files based on the comparison; adding javascript conditionals around the delta html files; and merging the delta html files into the depth N−1 expansion; and expanding and collapsing the section data at the client end. The recursive intelligent process steps further comprise: fetching a URL; performing expansions for all depths; parsing the document; constructing a URL to expand unexpanded sections or fetching a new URL if no unexpanded sections exist; and applying the constructed URL to an iterative process to expand all sections.

In a fourth aspect, the present invention is directed to a program storage device readable by a machine, tangibly embodying a program of instructions executable by the machine to perform method steps for migrating a Lotus Notes Domino document to a non-Domino web server having a client end and a server end, the method steps comprising: performing iterative recursive intelligent fetch process steps; performing a recursive differential process step; and expanding and collapsing the section data at the client end. The iterative recursive intelligent fetch process includes: parsing the Domino document; identifying unexpanded sections; and constructing a URL to expand the unexpanded sections.

In a fifth aspect, the present invention is directed to a program storage device readable by a machine, tangibly embodying a program of instructions executable by the machine to perform method steps for migrating a section-rich Domino document to a non-domino web server having a client end and a server end, the method steps comprising: performing iterative recursive intelligent fetch process steps including: parsing the Domino document; identifying unexpanded sections; and constructing a URL to expand the unexpanded sections; performing a recursive differential process step including: inputting expanded section data at depth N expansion; inputting expanded section data at depth N−1 expansion; comparing pre- and post-expanded section documents through differences in html; creating delta html files based on the comparison; adding javascript conditionals around the delta html files; and merging the delta html files into the depth N−1 expansion; and expanding and collapsing the section data at the client end.

BRIEF DESCRIPTION OF DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 depicts a sample document in various states of expanded sections.

DETAILED DESCRIPTION

In describing the preferred embodiment of the present invention, reference will be made herein to FIGS. 1-4 of the drawings in which like numerals refer to like features of the invention.

In describing the preferred embodiments, certain terminology used in the art has been adopted herein. To facilitate this description, this terminology is defined as follows. The terms "parent" and "child" refer to sections and their subsections, respectively. When referring to the "depth" of a subsection and how many "levels" a subsection may obtain, a numbered system is introduced. For example, at the top level there may be three sections, "1", "2", and "3". At the next level, sections "1" and "2" may have subsections "1.1", "1.2" and "2.1". Moreover, at the deepest level there may exist a third tier of sections: "1.1.1", "1.1.2" and "1.1.3". In the following example of the preferred embodiment, the sections are demonstrated as three levels deep, although the invention may certainly accommodate other levels of depth, and is not prohibited from doing so.

There are three features to the methodology of the present invention that allow for efficient migrating of Lotus Domino documents to a non-Domino web server. The present invention involves intelligent fetching of section-rich document data, which results in one fetch for the unexpanded document and one fetch per level, for a total of 1+N fetches. Importantly, fetching is limited to a page for each level. Maintaining this requirement eliminates hours of attempting to fetch $2^N$ pages. Furthermore, the present invention creates only one document containing all section data. This dramatically reduces the amount of data on the mirror server, and allows for the expansion and collapsing of section data using portable JavaScript, which is done at the client end, eliminating unnecessary server traffic.

Figure 1:
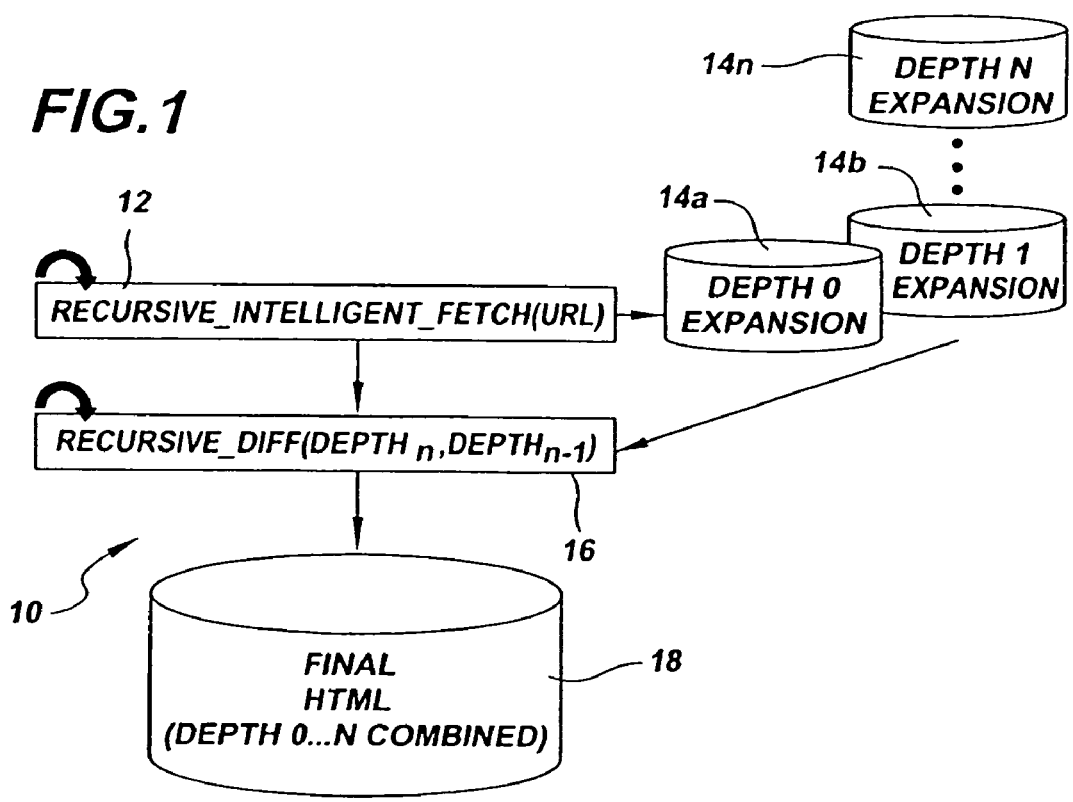
FIG. 1 is a flowchart of the main process flow of the present invention.

FIG. 1 depicts the main process flow 10 of the present invention. A recursive retrieval or fetch step 12 of URL data is performed for different section depths 14a, 14b, 14n. Expansion depth levels 0 through N are retrieved. Next, a reiterative differential comparison process step 16 is performed on the acquired depth level data. The output is a final html document 18 having the depth levels 0 through N combined.

Figure 2:
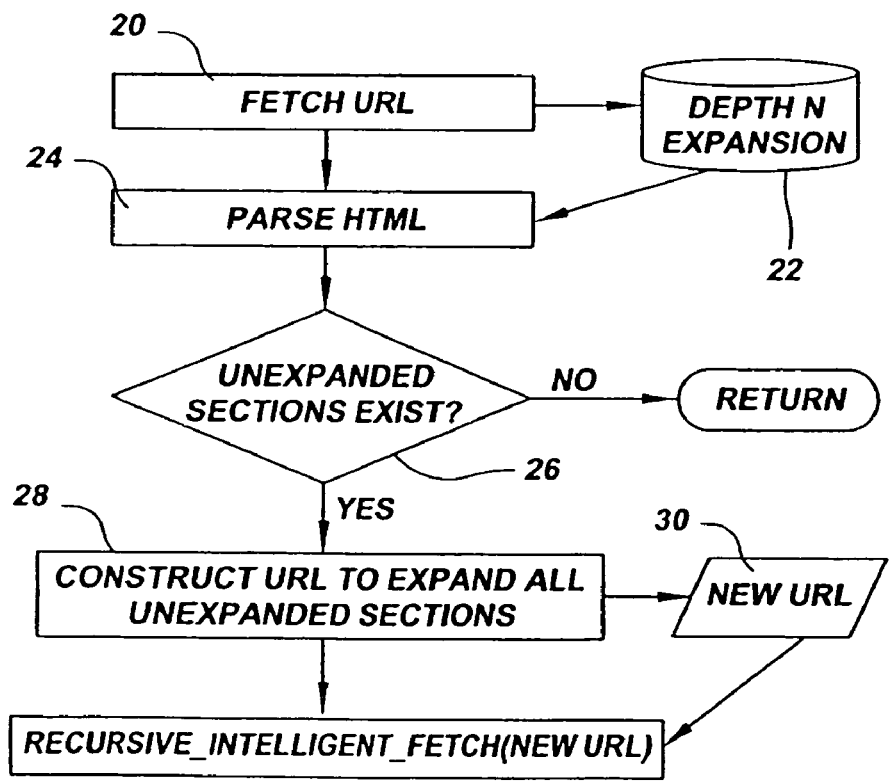
FIG. 2 is a flowchart depicting the recursive intelligent fetch process feature.

Three process features are defined to implement the intelligent retrieval or fetching of the present invention, FIG. 2. This intelligent fetching of section-rich document data results in 1+N fetches, one fetch per level of sections. The first process feature is accomplished via iterative parsing of the Lotus Domino document to determine construction of the next URL that expands all known sections, as opposed to expanding each section one at a time. First, the URL is fetched 20. Expansions are performed for all depths (0 through N) 22, and the document is parsed 24. If unexpanded sections exist 26, a URL is constructed to expand the unexpanded sections 28; else a new URL is fetched. The constructed URL 30 is applied in an iterative process until there are no more unexpanded sections. For example, in a first fetching step, a document is retrieved with all sections (if any) collapsed. The document is then parsed, looking for discrete sections. If sections exist, a second fetching step is performed. The second fetching step retrieves the document with all level 1 sections expanded. Any new subsections are revealed and parsed. If new subsections exist, a third fetching step is performed. The document is retrieved with all level 2 sections expanded. Any new sub-tier sections (sub-subsections) are again revealed and parsed, and subsequent iterative fetching steps are performed until all level N sections are expanded.

The next two process features are implemented by comparing the pre- and post-expanded section documents to determine which data belong to a particular section and how to construct a conditional JavaScript toggle display of the section data.

Figure 3:
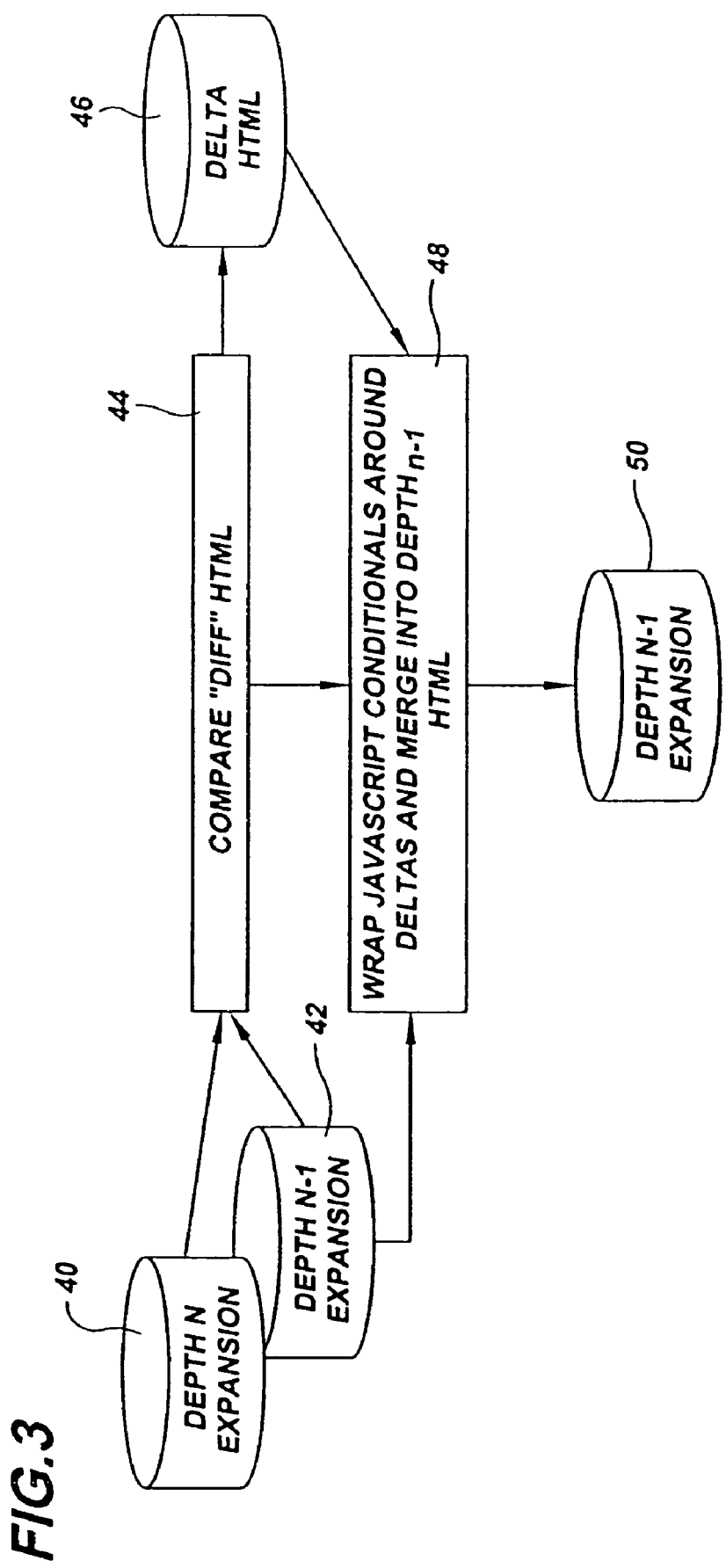
FIG. 3 is a flowchart depicting the recursive differential process feature.

FIG. 3 depicts the process steps for the recursive differential feature. Specifically, comparative measures are made between expanded documents. Documents having N expansions 40 and N−1 expansions 42 are compared for html differences 44. A delta html 46 is calculated. Javascript conditionals are then applied to the html deltas 48 and merged into depth N−1. Expansions of depth N−1 are then stored 50.

The Javascript conditionals include setting cookies to remember the expanded sections. For example, when clicking on a triangular "twisty", the representative JavaScript for this task includes:

```
if (session cookie remembers section was expanded) {
    (set cookie to remember section now collapsed)
    document.write(html for collapsed section)
}
else {
    (set cookie to remember section now expanded)
    document.write(html for expanded section)
}
```

The JavaScript used in this implementation is very basic and not particular to any proprietary object model, making it operational on any browser with a JavaScript interpreter. Cookies are used to preserve the state of expansion (optionally, this state may be preserved across sessions), and are modified when a user clicks on a triangular "twisty."

FIG. 4 depicts a sample document in various states of expansion. Collapsed and expanded triangular "twisties" 50 indicate expanded or collapsed views. In a first segment 52, none of the sections are expanded. In a second segment 54, section 2 is expanded, revealing three subsections 2.1, 2.2 and 2.3. In a third segment 56, section 2.3 is further expanded into sub-subsections 2.3.1, 2.3.2 and 2.3.3. Last, in a fourth segment 58, section 2.3.2 is expanded to reveal that there are no other sub-tier sections to this subsection.

Instructing Lotus Domino to expand particular sections may be accomplished via an ExpandSection html query, such as, ExpandSection=1, 2, 3, 1.1.

In another embodiment, the program of instructions executing the present invention may be employed within a program storage device readable by a machine to perform method steps for migrating a Lotus Notes Domino document to a non-Domino web server. The method steps include performing iterative recursive intelligent fetch process steps; performing a recursive differential process step; and expanding and collapsing the section data at the client end.

Figure 5:
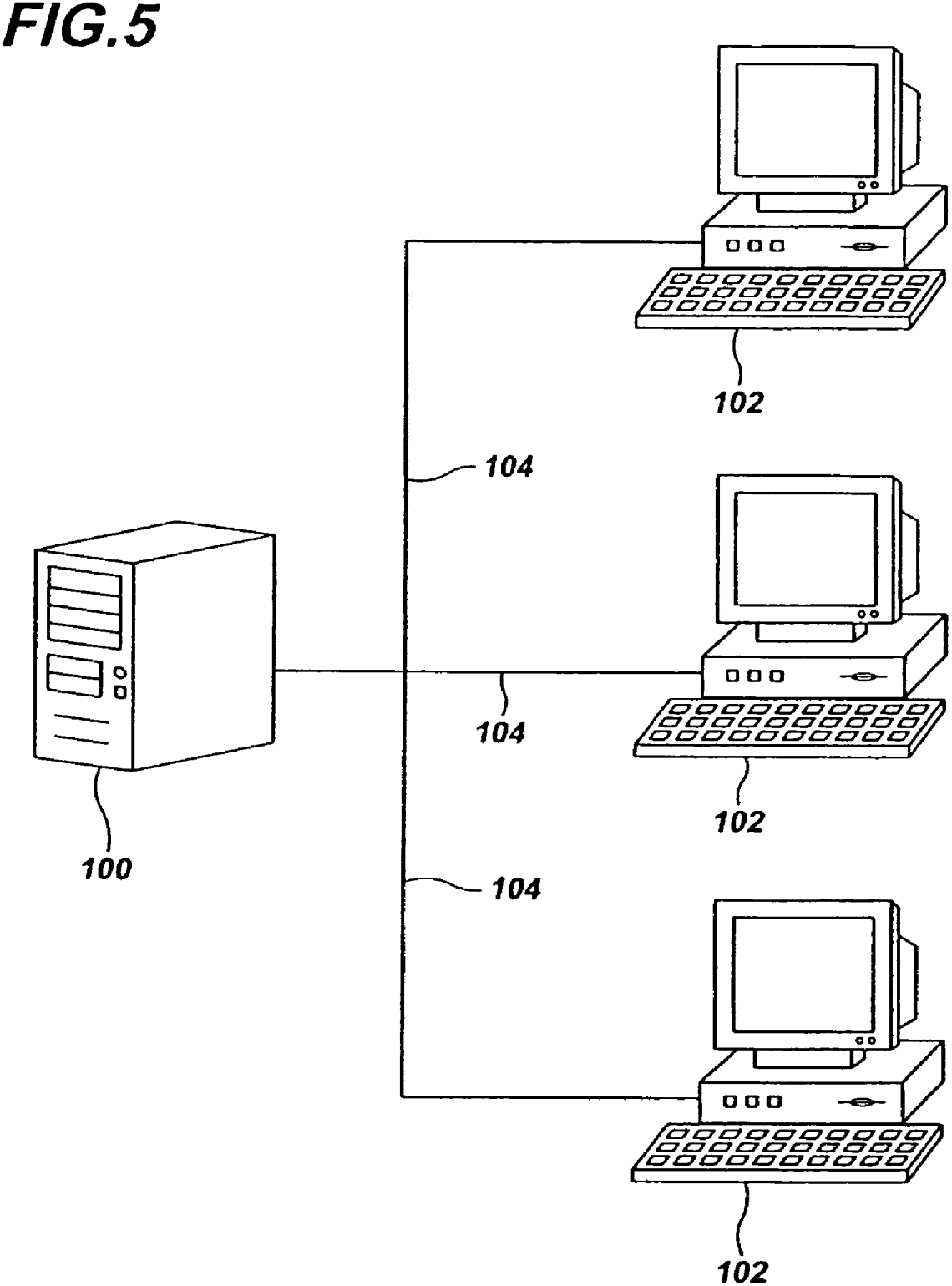
FIG. 5 depicts computer system of program storage and execution devices for implementing the instructions of the present invention.

FIG. 5 depicts computer system of program storage and execution devices for implementing the instructions of the present invention. Processing system 100 is connected to I/O units 102 through data links 104, allowing users to input data, view and migrate documents pursuant to the present invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of migrating a section-rich Domino document to a non-domino web server having a client end and a server end, comprising:
    performing iterative recursive intelligent fetch process steps;
    performing a recursive differential process step; and
    expanding and collapsing said section data at said client end;
        wherein said recursive differential process step includes:
        inputting expanded section data at depth N expansion, where N represents the maximum level of expansion;
        inputting expanded section data at depth N−1 expansion;
        comparing pre- and post-expanded section documents through differences in html;
        creating delta html files based on said comparison;
        adding javascript conditionals around said delta html files; and
        merging said delta html files into said depth N−1 expansion.

2. The method of claim 1 including instructing Domino to expand each section by an expandsection html query.

3. The method of claim 2 wherein said expandsection html query includes said html query for a plurality of section expansions.

4. The method of claim 3 including said html query of a form: /asdasd&ExpandSection=1, 2, 3, 1.1.

5. The method of claim 1 including identifying data for each of said sections by comparison of pre- and post-expanded section documents.

6. The method of claim 1 wherein said parsing said Domino document includes:
    performing an iterative process to identify all sub-sections of said document, comprising:
        fetching a document with all sections collapsed and identifying sections having expansion;
        if level 1 section expansions are identified, fetching said document having level 1 sections expanded;
        discovering and parsing new sub-sections below said level 1 sections;
        if level 2 section expansions are identified, fetching said document having level 2 sections expanded;
        discovering and parsing new sub-sections below said level 2 sections; and
        continuing said iterative process until level N section expansions are identified and fetched.

7. The method of claim 1 wherein said javascript conditionals include instructions to display section data.

8. The method of claim 7 including using cookies to preserve each expansion state.

9. The method of claim 8 including modifying said expansion state by having a user click on a triangular twisty.

10. The method of claim 1 wherein said javascript comprises:
    a session cookie remembering when said section was expanded;
    a set cookie to remember when said section is collapsed; and
    a set cookie to remember when said section is currently expanded.

11. The method of claim 10 further comprising a command html for a collapsed section and a command html for an expanded section.

12. A program storage device readable by a machine, tangibly embodying a program of instructions executable by the machine to perform method steps for migrating a Lotus Notes Domino document to a non-Domino web server having a client end and a server end, said method steps comprising:

performing iterative recursive intelligent fetch process steps;

performing a recursive differential process step;

expanding and collapsing said section data at said client end;

inputting expanded section data at depth N expansion, where N represents the maximum level of expansion;

inputting expanded section data at depth N−1 expansion;

comparing pre- and post-expanded section documents through differences in html;

creating delta html files based on said comparison;

adding javascript conditionals around said delta html files; and merging said delta html files into said depth N−1 expansion.

* * * * *